July 11, 1944.   F. C. W. THIEDE   2,353,422
METHOD AND MEANS FOR RECORDING AND REPRODUCING SIGNALS
Filed Sept. 18, 1940   6 Sheets-Sheet 1
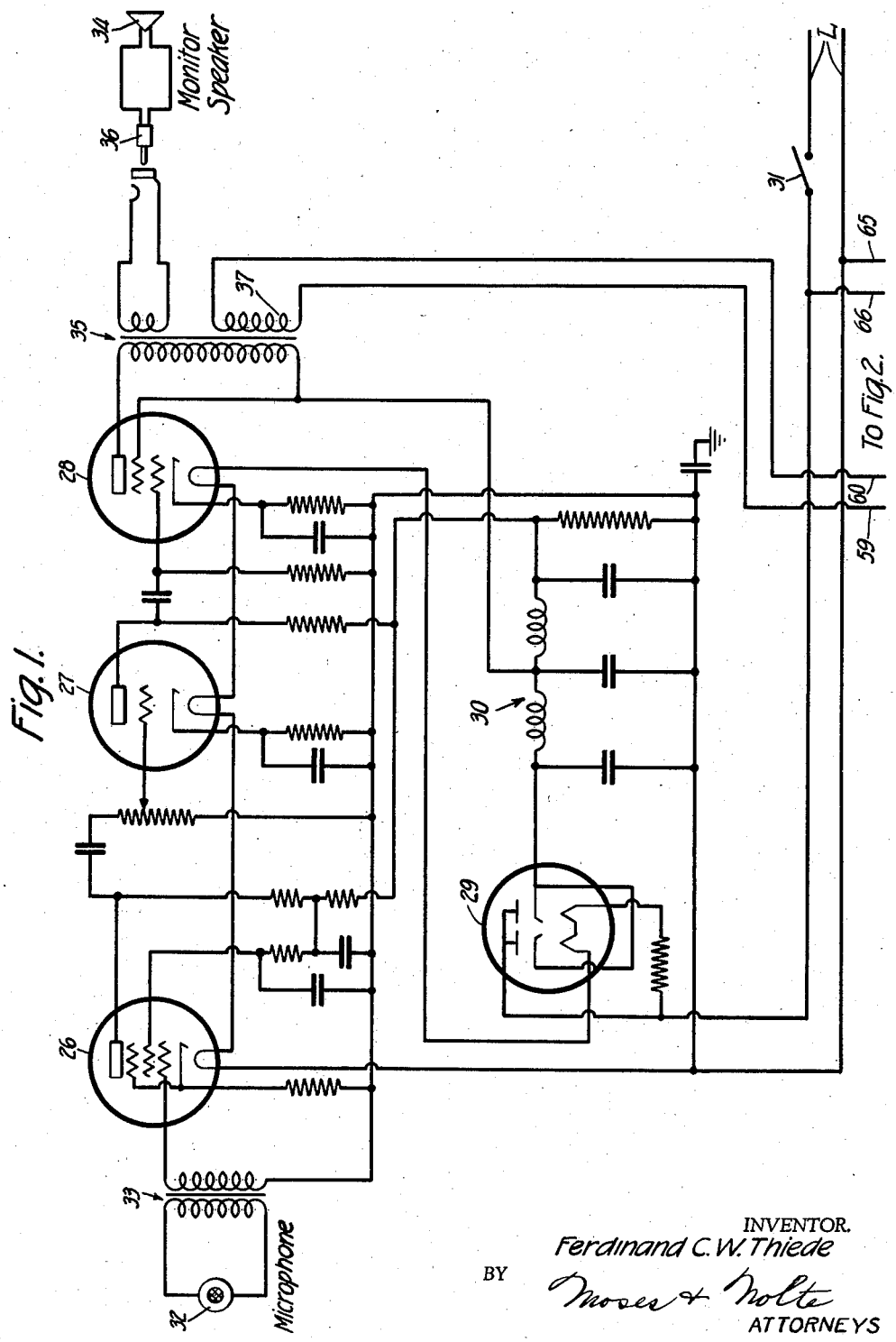
INVENTOR.
Ferdinand C. W. Thiede
BY
Moses & Nolte
ATTORNEYS

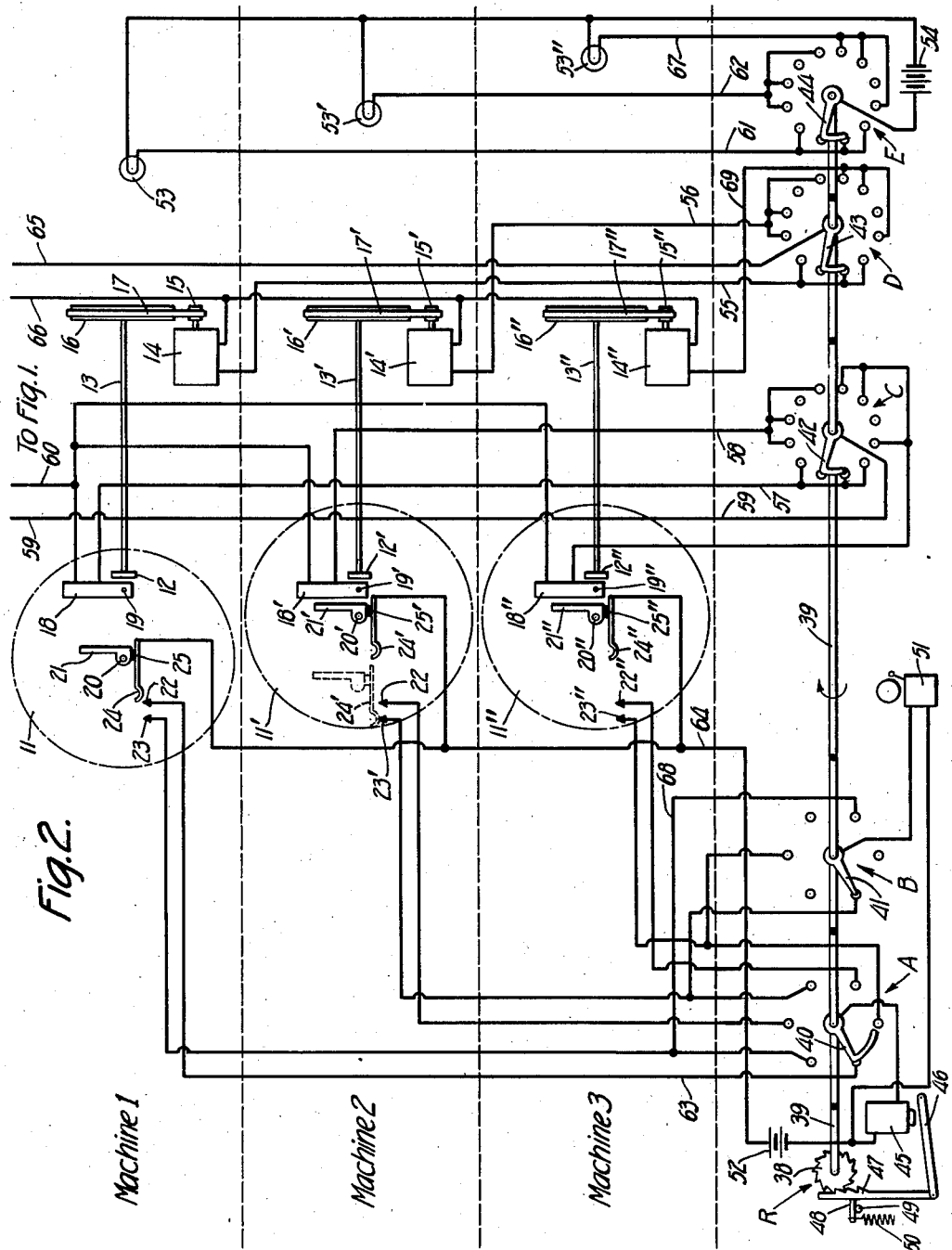

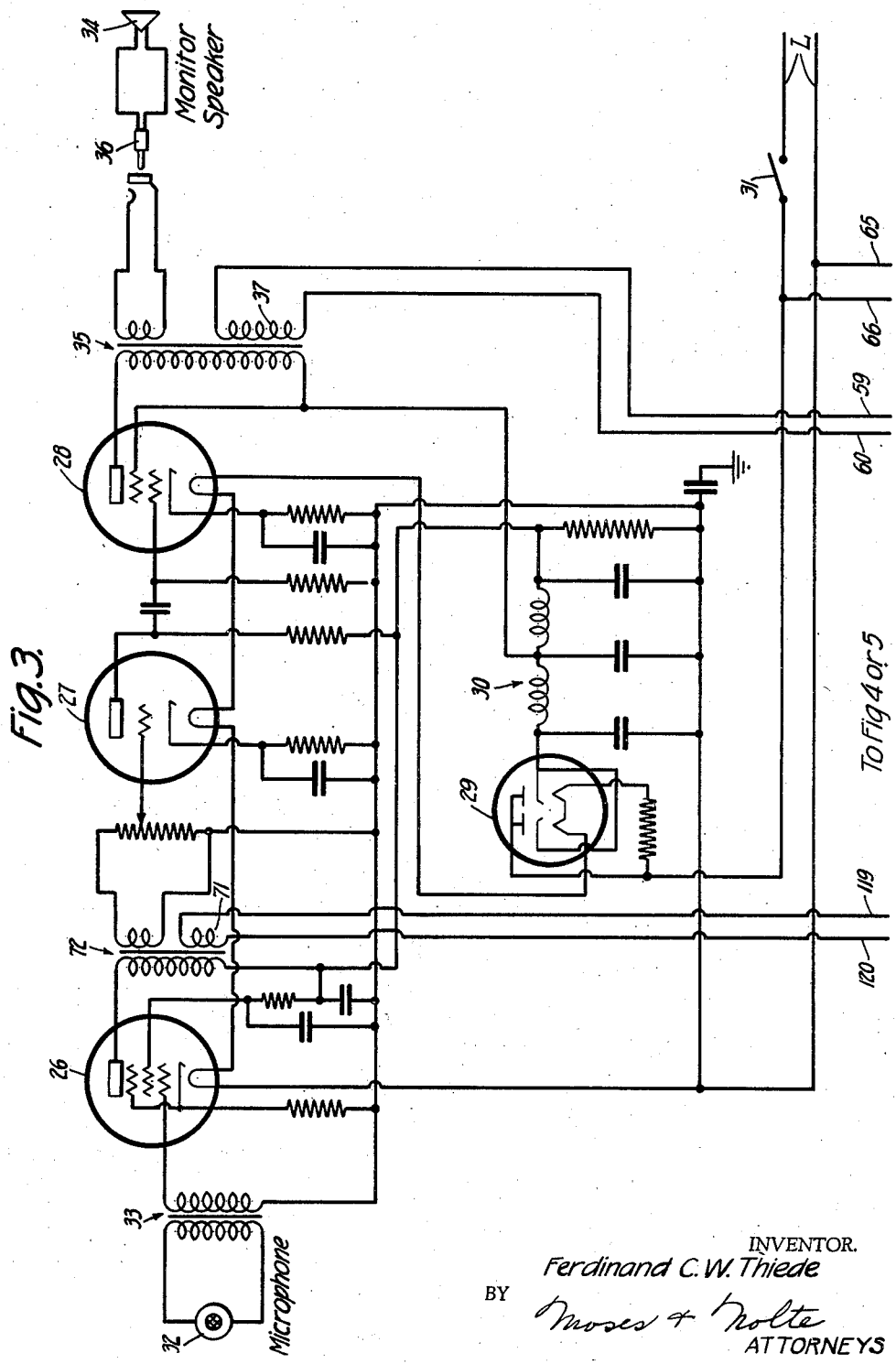

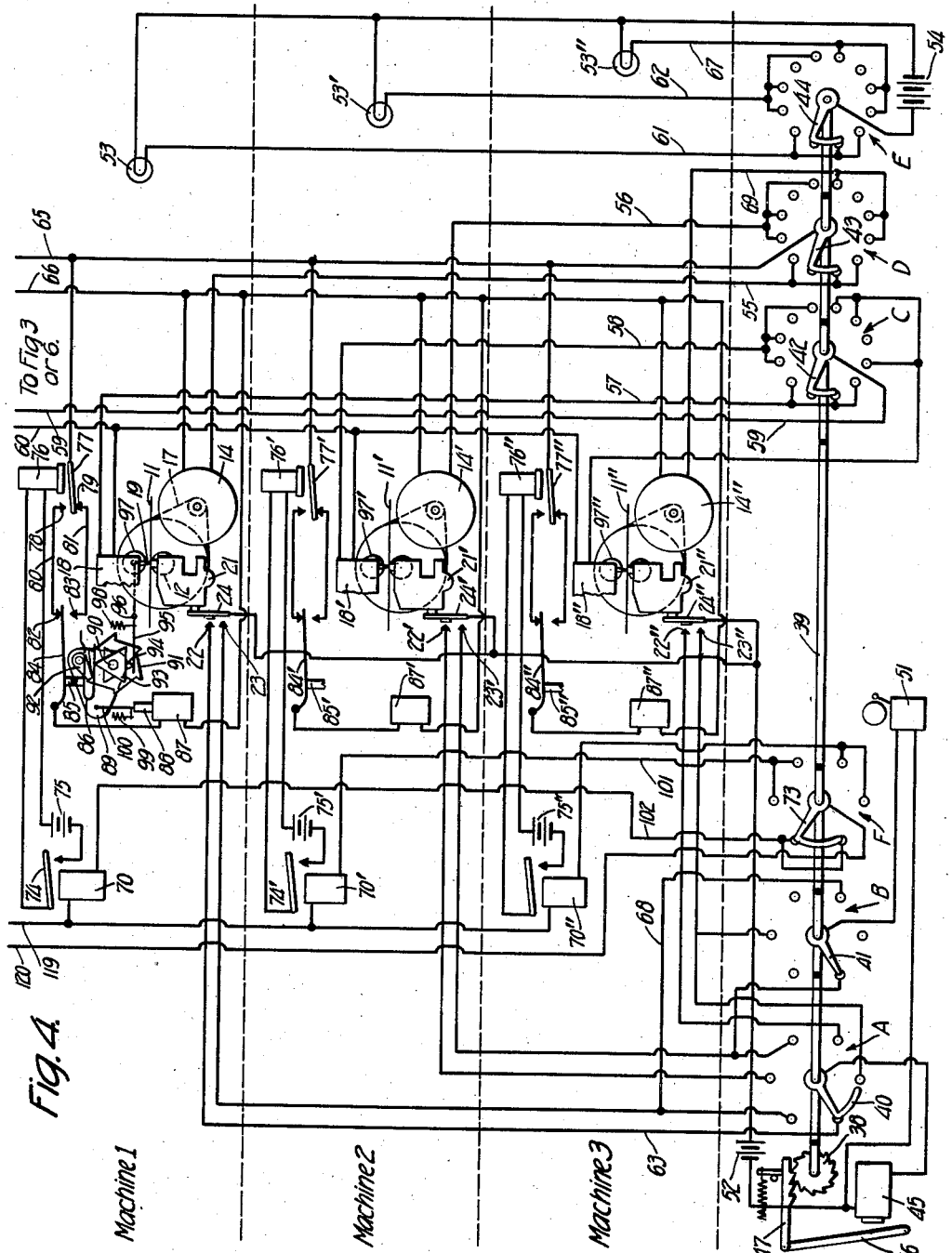

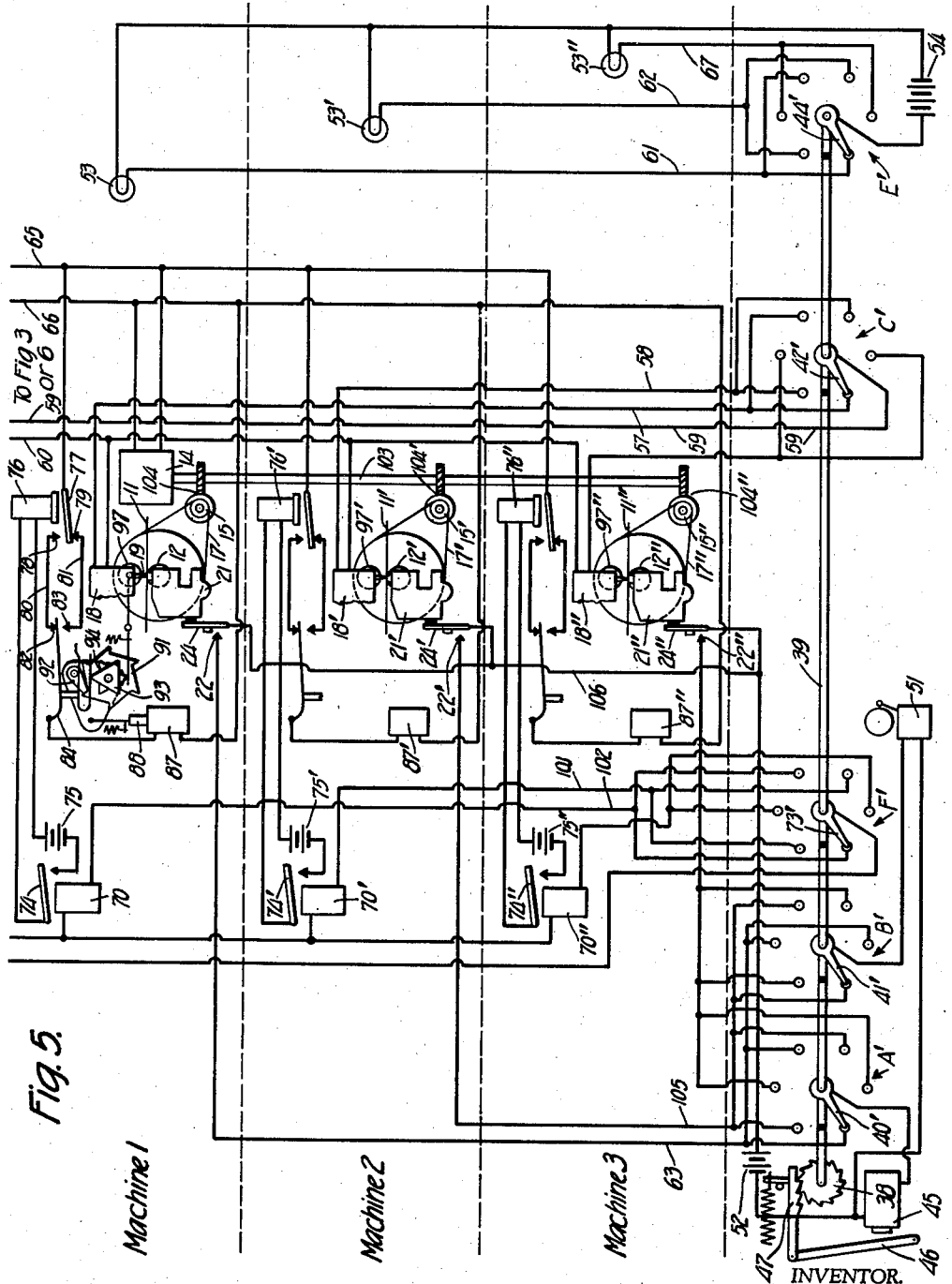

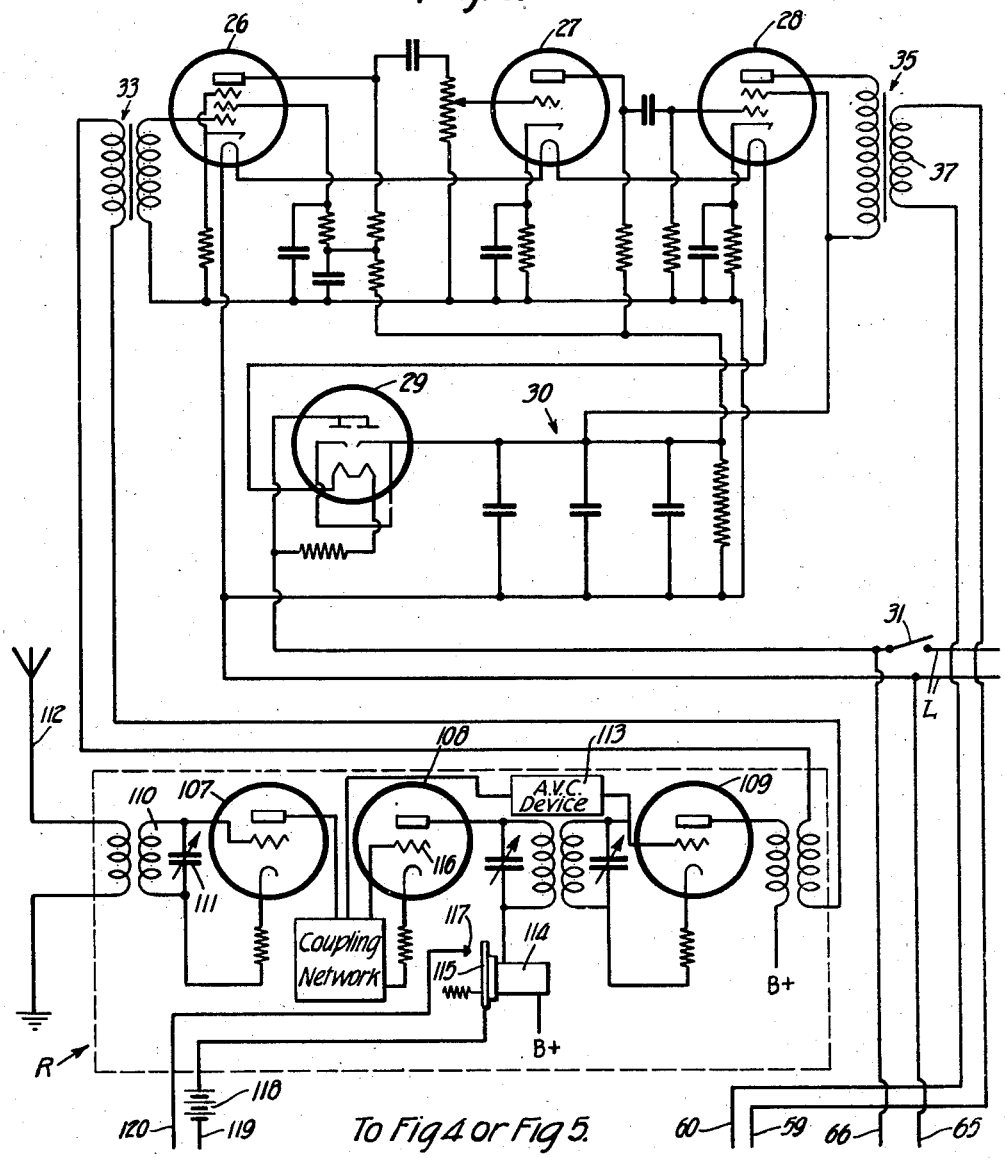

Patented July 11, 1944

2,353,422

UNITED STATES PATENT OFFICE 2,353,422

METHOD AND MEANS FOR RECORDING AND REPRODUCING SIGNALS

Ferdinand C. W. Thiede, Hempstead, N. Y., assignor to B. A. Proctor Company, Inc., New York, N. Y., a corporation of New York Application September 18, 1940, Serial No. 357,245

24 Claims. (Cl. 179—100.11)

This invention relates to a method and means for recording signals of substantial duration on two or more recording mediums as, for example, phonograph records. As now practiced, the recording of a long signal communication requires the manual switching on by the operator of the second recording machine when the record on the first machine is completed and also the operation of a manual switching device to disconnect the recording unit of the first machine and to connect the recording unit of the second machine to the microphone or other signal source. This practice requires considerable skill and extreme care on the part of the operator and it is extremely difficult to prevent the loss of a portion of the signal during the transfer period from one machine to the other so that the entire signal is not recorded.

It is the main purpose of the present invention to overcome these disadvantages by the provision of a recording device which includes two or more recording machines in which the recording is commenced and continued on a record of the first machine, and when the record has proceeded to a predetermined point of this machine, a second machine is automatically started and the recording then proceeds on the second machine. Where a large amount of recording is required, additional machines may be provided, the recording being effected on the several machines consecutively, each machine being automatically started by the next preceding machine of the series.

The point in the recording on the first machine at which the second machine is started may be some time before the record on the first machine is completely full, or at the end of the record on the first machine. In the former case, a portion of the complete signal will be recorded on both machines, that is, there will be an overlap in the recording on consecutive machines, as, for example, the first and second of a series.

It is a further object of the present invention to provide a method and means for recording signals whereby any loss of the signal during the shift over from one machine to the next is prevented. A cognate object of the invention is to provide a recording device in which the second machine of a series is not started until the record on the first machine is completely full, so that there is no overlap in the recording, but each portion of the signal is recorded on only a single record.

Another object of the invention relates to a step by step switching device for switching in the recording devices of the recording machines of a group consecutively, this switching device being preferably controlled by means of an electrical circuit including a switch on each machine which is actuated by the lateral movement of a carriage on which the record is mounted. In further pursuance of this object of the invention, the switching device is arranged to again switch in the first machine of a bank of similar machines, when the recording on the last machine thereof is about completed. This latter arrangement permits the recording of a very long signal communication by means of a small number of recording machines.

A still further object of the invention lies in the provision of an indicating device in connection with each recording machine, to indicate when a signal is being recorded thereon. In further pursuance of this object, the indicating devices are preferably so arranged and connected that when a signal is being recorded on two machines simultaneously, the indicators thereof are automatically rendered effective to indicate to the operator that recording is proceeding on the two machines.

Another object of the invention lies in the provision of an indicating means forewarning the operator, while recording is proceeding on one machine, if the next succeeding machine is not loaded with a blank record and ready for recording. The means for warning the operator is preferably arranged so as to notify him a sufficient period of time before the recording on one machine is complete so as to give him ample opportunity to prepare the next machine for recording as, for example, by loading it with a blank record and moving its record carriage into proper position for recording.

Other and further objects of the invention will become apparent to those skilled in the art as the description thereof proceeds. For a better understanding of the invention, reference is made to the following description taken in connection with the accompanying drawings in which the same reference numeral is used to indicate the same part in the several figures, in which, Figs. 1 and 2 illustrate schematically an embodiment of the invention employing three recording machines and including the schematic circuit diagram of an amplifier device for operating the recording units;

Figs. 3 and 4 illustrate schematically a modified form of the invention employing three recording machines and the schematic circuit diagram of an amplifier device arranged to cause the automatic starting and stopping of the records in response to the operator's voice;

Figs. 3 and 5 illustrate schematically a modified form of the invention similar to that shown in Figs. 3 and 4, but in which a single electric motor is utilized to drive the three recording machines;

Figs. 4 and 6 illustrate schematically another modification of the invention adapted for recording a signal transmitted by radio on three recording machines;

Figs. 5 and 6 illustrate schematically a modified form of the invention similar to that shown in Figs. 4 and 6, but in which a single electric motor is utilized to drive the three recording machines.

Referring to Figs. 1 and 2, the invention is shown in connection with a plurality of recording machines of the type shown in patent application Ser. No. 218,982, filed July 8, 1938, in the name of Barton A. Proctor and Ferdinand C. W. Thiede and an amplifying device of the type shown in said application for amplifying the signals to be recorded. In the illustrated embodiment, a bank of three similar recording machines are shown, the first machine comprising a thin, flexible bent record 11 adapted to be engaged and rotated by a friction drive roller 12 connected to a drive shaft 13. Shaft 13 is driven by an electric motor 14 by means of the pulleys 15, 16 and a belt 17. Each machine also comprises a recording unit 18 provided with a stylus 19 adapted to form the sound track in the upper face of the record 11. The record is mounted on a rotatable record supporting spindle 20 supported in an end frame member 21 forming part of a record carriage. For the purpose of starting the next succeeding machine and subsequently stopping the active one, suitable control circuits are shown terminating in the inner and outer contacts 22, 23 respectively, which are adapted to be successively engaged by a switch contact 24 carried by the carriage frame member 21 but insulated therefrom, as shown at 25. The corresponding parts of the second and third machines of the bank are indicated by the corresponding reference numerals primed and double primed.

For the purpose of supplying the signaling currents to be recorded to the recording units 18, 18' and 18", an amplifying device similar to that disclosed in the aforementioned application is provided. This amplifier is illustrated as comprising the resistance coupled amplifying tubes 26, 27 and 28 to the elements of which suitable operating voltages are supplied by a rectifier device 29 and filter circuit 30 connected to the power lines L through a switch 31. The sound waves of the signal or communication to be recorded are impressed on a microphone 32 which is shown connected to the input circuit of the first amplifying stage 26 by means of a transformer 33. For monitoring the recording, a loud speaker 34 may be connected to the output circuit of amplifier stage 28 by means of a transformer 35 and a jack 36. The amplified signal currents are applied to the recording units 18, 18' and 18" through the circuit shown, including the transformer winding 37 and a switch device C, Fig. 2.

The switch C and a series of switches A, B, D and E are operated by means of a ratchet device R, comprising a ratchet wheel 38 secured to a rotatable switch shaft 39 carrying the switch blades 40, 41, 42, 43 and 44, the several sections of shaft 39 being insulated from each other, as shown. A step-by-step relay 45 is provided to rotate the switch shaft 39 around in steps of 60 degrees, this relay comprising an armature 46 to which is pivotally secured a toothed ratchet arm 47 adapted to rotate the ratchet wheel 38 through steps of 60 degrees. To limit the motion of ratchet arm 47, it is provided with an abutment 48 adapted to engage a fixed stop pin 49 under the bias of a spring 50.

In the illustrated embodiment of the invention, the machines are shown with the record 11 partly recorded and the records 11' and 11" blank. With the power switch 31 closed, a recording is being made on the record 11, power being supplied to its driving motor 14 through the circuit shown, including the switch blade 43. The amplified signal currents actuate the stylus 19 of the recorder 18, the latter being connected to the output circuit of amplifier 28 through the circuit shown, including the switch blade, 42.

For the purpose of indicating to the operator after the recording is commenced on the first machine whether the second machine is loaded with a blank record and ready for recording after record 11 is completed, an electric bell 51 is connected in series with a battery 52 and the switch blade 41. Should the second machine not have been loaded with a blank record, its carriage frame 21' would be at its extreme left position as indicated in broken lines, and its switch blade 24' in engagement with switch contact 23' thereby completing the circuit through the bell 51 and battery 53 and causing the bell to ring, thus warning the operator to load the second machine with a blank record and move its carriage and the record 11' to the extreme right into the position shown, ready for recording. This warning occurs as soon as the preceding machine is rendered active, because of the relation of the switch arm 41 with respect to the switch arm 40.

A series of signal lights, 53, 53', 53" is provided to indicate when a signal is being recorded, or in other words when a machine is active, these lights being connected to the switch E and a battery 54 by the circuits shown. With recording proceeding on machine 1, this condition is indicated by the lighting of lamp 53 by current from the battery 54, the circuit being completed through switch blade 44, as indicated.

As disclosed in the aforesaid application in connection with a single machine, as the recording proceeds on machine 1 its carriage member 21 and the record 11 are automatically fed to the left. Since the feed roller 12 rotates at a constant speed, the angular velocity of the record progressively decreases as it and the spindle 20 are advanced to the left and the distance between the spindle 20 and the recording stylus 19 progressively increases. When the switch blade 24 comes into engagement with the contact 22, the circuit through stepping relay 45, battery 52 and switch arm 40 is completed, causing the operation of relay 45 and the rotation of ratchet wheel 38 and switch shaft 39 through an angle of 60°. This causes the switch blade 43 to engage the third contact (counting in the clockwise direction) connected to lead 55 and also the first contact connected to lead 56 thereby completing the circuit through motor 14', causing the latter to start and commence the rotation of record 11' on machine 2 while machine 1 is still running. At the same time the switch blade 42 is brought into engagement with the third contact connected to lead 57 and the first contact connected with lead 58 thereby also connecting the recording unit 18' of machine 2 to the output of the amplifier 28 through the circuit shown, including the leads 58 and 59—60. The recording then proceeds on both the records 11 and 11' until the record 11 is filled. The advancing of the switch blade 44 into engagement with the third contact connected to lead 61 and the first contact connected to lead 62 causes both of the lamps 53 and 53' to be illuminated, thereby indicating to the operator that the recording is proceeding on both machines 1 and 2. This condition continues as the record 11 is fed further to the left until the switch blade 24 comes into engagement with contact 23, which causes the completion of the circuit shown through the step relay 45, including the battery 52, coil of relay 45, switch blade 40, lead 63 and return lead 64. Operation of the relay 45 causes the ratchet wheel 38 and switch shaft 39 to be rotated through another step of sixty degrees, causing the switch blade 43 to leave the third contact connected to lead 55 thereby breaking the circuit of motor 14 at this point and causing the motor and record of the first machine to stop. The switch blade 42 also leaves the third contact of lead 57 to render the recording device 18 of the first machine inactive.

The second machine continues to run, however, since the switch blade 43 is still in engagement with the second contact connected to lead 56, thus completing the circuit of motor 14' through the lead 65, switch blade 43, lead 56 and lead 66. Simultaneously with the stopping of the motor of machine 1, the switch blade 44 leaves the third contact connected to lead 61 thereby breaking the circuit through the lamp 53 which is no longer illuminated, indicating to the operator that machine 1 is not recording. Switch blade 44 however, is in engagement with the second contact connected to lead 62, thus completing the circuit through battery 54 and lamp 53', illumination of the latter indicating that the signal is being recorded on machine 2. Since the switch blade 42 is now no longer connected to any contact connected to lead 57, the circuit connecting the recorder 18 to the output of the amplifier 28 is broken, and the recorder 18 is no longer energized by the signal current.

Should the third machine not be loaded with a blank record and its carriage member 21'' be at the extreme left of its movement when the recording commences on machine 2, this condition will be indicated to the operator by the ringing of bell 51. The circuit through the bell and battery 52 is completed through the lead 64, switch blade 24'', contact 23'', the second contact of switch B and switch blade 41. The ringing of the bell 51 is thus an indication to the operator that machine 3 should be loaded and its carriage moved into position to commence recording upon the completion of the record on machine 2. When the record on machine 2 is nearly full, the switch blade 24' comes into engagement with contact 22' and automatically starts the motor of machine 3 and simultaneously causes the signal to be recorded thereon in the manner above described for machine 2. During this interval the lamp 53'' is also lighted by current passing through the switch blade 44 and lead 67, the illumination of lamps 53' and 53'' indicating that the recording is proceeding on machines 2 and 3. Upon the switch blade 24' engaging contact 23' at the end of record 11', stepping relay 45 is again actuated and the circuit of motor 14' broken by the switch arm 43 leaving the third contact of lead 56, causing the second machine to come to rest, the recording proceeding on the record 11'' of machine 3. If at this time a blank record has not been put in position on machine number 1, and its carriage frame 21 moved to the extreme right adjacent to recorder unit 18, its switch blade 24 will be in contact with contact 23. At this time switch arm 41 will be in engagement with the third contact of switch B and the circuit through the battery 52 and bell 51 will be completed through the circuit shown including the lead 68. The ringing of the bell warns the operator that machine number 1 should be reloaded and adjusted into position for recording before the completion of the record on machine 3.

When the record 11'' on machine 3 is nearly completed, the switch blade 24'' comes into engagement with contact 22'' causing another operation of the stepping relay 45 and the automatic starting of machine 1, the circuit of whose motor 14 is completed by the switch arm 43 coming into contact with the first contact of lead 55; simultaneously the amplified signal currents are applied to the recording unit 18 whose circuit is completed by the switch arm 42 coming into contact with the first contact of lead 57, so that the recording proceeds on the records of both number 3 and number 1 machines. Upon completion of the recording on machine 3, the switch blade 24'' comes into engagement with contact 23'' again causing the operation of the stepping relay 45 and the rotation of switch shaft 39 through another 60 degrees into its initial position, as shown. This rotation of the switch shaft 39 causes the circuit of the motor 14'' to be broken by the switch arm 43 leaving the third contact of lead 69 so that the third machine comes to rest. Also the switch arm 44 moves out of engagement with the third contact of lead 67 interrupting the circuit through the lamp 53'' thereby indicating that the recording on machine 3 has been stopped.

While the invention has been described in connection with three recording machines it is to be understood that it is equally adapted for use with two or more machines, the several switches A, B, C, D and E being provided with a corresponding number of contacts. The several recording machines are preferably disposed in the same room and closely adjacent to each other on the same support, as, for example, in a bank of machines, but they may be disposed otherwise if desired. It is not necessary, however, for the practice of the invention that all the machines be disposed in the same room or even in the same building.

The embodiment of the invention shown in Figs. 3 and 4 is generally similar to that shown in Figs. 1 and 2, but in Fig. 4 a fragmentary end view of each machine is shown in which the record appears edgewise and each machine is provided with means of the type disclosed in application Serial No. 353,612, filed August 22, 1940, in the name of Ferdinand C. W. Thiede, for causing it to be automatically started and stopped by the voice of the operator. The automatic starting and stopping mechanism, as shown in connection with machine 1 comprises a quick acting relay 70 which is energized by the amplified signal currents in the secondary winding 71 of a transformer 72 which serves to couple the input circuit of amplifier 27 to the output circuit of amplifier 26, the circuits of the several relays being completed through an additional switch F provided on the shaft 39 and comprising a switch arm 73 secured to this shaft. Upon the operator speaking into the microphone 32, the amplified voice currents appearing in the winding 71 cause the operation of the audio relay 70 and its armature 74 to be drawn down, thus closing the circuit shown through a battery 75 and a slow acting relay 76. The slow acting or delay relay 76 is of a type such that its armature 77 is maintained in engagement with the core of the relay for a short time after current has stopped flowing through the relay winding. The armature 77 operates between upper and lower contacts 78, 79 carried by a pair of conductors 80, 81 whose opposite ends terminate in the upper and lower contacts 82, 83. A switch blade 84 is movable between the contacts 82, 83, and is actuated by an insulating rod 85 operable by a spring 86. The circuit between the power supply leads 65, 66 is completed through the winding of a solenoid 87 provided with a plunger 88. Plunger 88 is connected to a pawl operating lever 89 pivoted on a shaft 90, which also carries a ratchet wheel 91 cooperating with a pawl 92 carried by the lever 89. The shaft 90 also carries a pair of cams 93, 94 having the high point of one cam disposed in line with the low point of the other, as shown. The machine is provided with a feed roller supporting lever 95 pivoted at 96 and carrying at its outer end a friction roller 97 adapted to be pressed firmly against the upper surface of the record 11, directly opposite the lower feed roller 12 under the bias of a spring 98 connected to the lever 95. Upon the depression of the solenoid plunger 88, the ratchet wheel 91 is advanced counter-clockwise by a distance of one tooth under the action of the pawl 92. The simultaneous rotation of the high spot of the cam 93 away from the spring 86 causes the switch blade 84 to be lowered and break the energizing circuit of the solenoid 87 at the contact 82. Upon this solenoid being deenergized, the plunger 88 and pawl 82 are returned to their initial position shown under the bias of a spring 99 which is connected to a link 100 which connects the pawl lever 89 and plunger 88. The rotation of the shaft 90 also causes the high point of the cam 94 to be moved away from the lever 95 permitting the friction feed roll 97 to be lowered into engagement with the record 11 under the bias of spring 98. Since the records are made of very thin material and are not mounted on turntables, their inertia is very small so that the record 11 immediately starts to rotate under the action of the feed rollers 12 and 97 which are driven in opposite directions by means not herein shown, but described in the aforementioned application Ser. No. 218,082. The speech is recorded on the record by the movable stylus 19 of the recording unit 18 to which the amplified speech currents are supplied by means of the circuit shown, including the secondary transformer winding 37, leads 59 and 60 and switch arm 42.

As explained more fully in the above referred to application Ser. No. 353,612, the solenoid 87 is not operated during those brief intervals which occur between words or sentences in the signal being recorded, since the armature 77 of delay relay 76 remains in its upper position in engagement with contact 78. Should the dictation before the microphone 32 be interrupted for an appreciable period of time, however, the rotation of the record 11 is immediately stopped by the following described means. Upon the armature 77 of relay 76 dropping to its lower position in engagement with contact 79 (the switch lever 84 now being in engagement with contact 83) the circuit between the power leads 65, 66 and the winding of solenoid 87 is again closed, causing the plunger 88 to be pulled in and to rotate the ratchet wheel 91 another step. This causes a high point on the cam 94 to come into engagement with the lever 95 and depress the corresponding end thereof, causing the feed roll 97 to be disengaged from the surface of the record 11 and to again assume the position shown in the drawings.

As the dictation proceeds, and some time before the record 11 is completely filled, the switch blade 24 comes into engagement with the contact 22 and causes the switch shaft 39 to be stepped around through an angle of 60° in the manner above described in connection with Figures 1 and 2. This brings the switch blade 73 into contact with the first contact of lead 101 while it is also in contact with the second contact of lead 102, thereby completing the circuits of both the relays 70 and 70'. The operation of the relay 70' by the amplified speech currents also causes the operation of the delay relay 76' and the lowering of the feed roller 97' into engagement with the surface of the record 11' of the second machine. The switch contact 42 now being in engagement with the third contact of lead 57 and also the first contact of lead 58, the recorders 18 and 18' are both energized by means of the amplified signal currents in the circuit shown, including the leads 57, 58, 59, 60 and switch arm 42, so that the recording proceeds on both the records 11 and 11'. This condition is indicated in the manner above described, by the lighting of both the lamps 53 and 53'.

When the record 11 is completely filled, the switch blade 24 of the carriage 21 comes into contact with the contact 23, causing the switch shaft 39 to be stepped around through another angle of 60°. This causes the energizing circuit of relay 70 to be broken by the switch arm 73 leaving the second contact of lead 102, while the energizing circuit of 70' remains closed, the recording proceeding on record 11'. The deenergization of relay 70 causes the stoppage of the record 11 in the manner above described, and also the stoppage of the motor 14 is effected whose circuit is broken by the switch arm 43 leaving the third contact of lead 55, while maintaining the circuit of the motor 14' of machine 2 closed by engagement with the third contact of lead 56. The operation of the warning bell 51 to indicate whether the next succeeding machine is properly loaded and in position for recording is the same as that above referred to and further description thereof is believed unnecessary.

The recording thus proceeds until the record 11' is filled, whereupon the switch shaft 39 is again stepped around by the relay 45 whose circuit is completed by the switch contact 24' coming into engagement with the contact 23'. This causes the motor 14' of the second machine to stop and the recording proceeds on the record 11" of machine 3 only. A fresh blank record having been placed on the first machine and its carriage moved into position near the recorder 18, the recording will proceed on this machine which is automatically started in the manner above referred to in connection with Figures 1 and 2, when the switch contact 24" of machine 3 comes into engagement with the contact 23". From the above it is apparent that the invention provides means whereby the starting and stopping of the record or records on which the recording is being made is effected automatically by the voice of the operator, and that there is no loss of the signal being recorded during the transfer of the recording from one machine to the next. For the sake of simplicity, the control means for raising and lowering the feed rollers 97' and 97" of machines 2 and 3 by means of the solenoids 87' and 87" have been omitted from the drawings, but they are like that of machine 1.

The embodiment of the invention shown in Figures 3 and 5 is generally similar to that shown in Figures 3 and 4, except that the records of all the machines are driven from a single electric motor 14 which is connected as shown to the leads 65—66. The shaft 103 of this motor is connected to the drive pulleys 15, 15' and 15" through the spiral gears 104, 104' and 104", so that the lower feed rollers 12, 12' and 12" are continually rotating during operation of the motor 14. The switch D for switching in the several motors shown in Fig. 4 is omitted, and the switch arms 40', 73', 42' and 44' have been modified so as to engage only a single contact of their appropriate switches. With the shaft 39 in the position shown, upon the dictator speaking into the microphone 32 of Fig. 3, the amplified speech current appearing in the secondary winding 71 causes the operation of relays 70 and 76 in the manner above described, and the lowering of the feed roller 97 into engagement with the record 11 of the first machine. This causes the record to immediately rotate and the signal to be recorded thereon by the stylus 19. At this time the circuit of lamp 53 is closed and the illumination of this lamp indicates that machine 1 is recording. If a pause is made in the dictation, the delay relay 76 operates to release its armature 77, the lowering of which causes the feed roller 97 to be elevated above the surface of record 11, so that the latter immediately comes to a stop. As the dictation proceeds, and the record 11 becomes filled, the switch blade 24 comes into engagement with the contact 22 thereby causing operation of the step relay 45, which rotates the shaft 39 through an angle of sixty degrees. This causes the circuit connecting the audio relay 70' with the secondary winding 71 to be closed by the switch arm 73' coming into engagement with the first contact connected to lead 101. The operation of relay 70' causes the operation of delay relay 76' and the lowering of feed roller 97' into driving engagement with the record 11' of machine 2. This record immediately commences to rotate and the signal is recorded thereon by its recording unit 18' which is now energized by the amplified signal currents passing through the lead 60, recording unit 18', lead 58, switch arm 42' and lead 59. The recording on machine 2 is indicated by the illumination of lamp 53' whose circuit through the battery 54 is now closed by the engagement of the switch arm 44' with the first contact connected to lead 62. The bell 51 operates in the manner above described to indicate to the operator whether the next succeeding machine is not loaded with a blank record and the record not moved into position for recording thereon. For example, with the switch shaft 39 in the position shown and recording proceeding on the record 11 of machine 1, if a blank record has not been placed on machine 2, and its record carriage 21' is at the end of its travel with the switch contact 24' in engagement with contact 22', a circuit is set up through the battery 52, bell 51, switch arm 41, lead 105, contact 22', switch contact 24' and lead 106. The passage of current through this circuit causes the bell 51 to ring, warning the operator that machine 2 needs reloading with a blank record and its carriage 21' moved inwardly toward the recorder 18' into position for recording. It is to be noted that in this embodiment of the invention recording proceeds on only a single record at one time, but since the lower feed rollers of the several machines are always rotating, there is no time lost in starting the rotation of the record of any machine automatically when the record of the next preceding machine has been filled. The extreme light weight and the small inertia of the records greatly assist in the starting of a record immediately upon the engagement of the feed roller 97 with its upper surface.

The embodiment of the invention shown in Figures 6 and 4 is generally similar to that shown in Figures 3 and 4, but instead of supplying the voice currents to the transformer 33 by means of a microphone, they are supplied thereto by the output circuit of a radio receiver R of the type disclosed in the above referred to application of F. C. W. Thiede. This receiver comprises an amplifying and detector stage 107, an intermediate frequency amplifier 108 and a second detector 109 whose output circuit is coupled with the input circuit of the audio amplifier 36 by means of the circuit shown. The input circuit 110 of the amplifier 107 may be tuned to the incoming carrier frequency which is modulated by the signal modulations by any suitable means, as, for example, the variable condenser 111. The carrier currents are supplied to the input circuit 110 from any suitable antenna device 112. An automatic volume control device 113 which is coupled to the input circuit of the detector 109 is also connected to the grid of the amplifier 108 to regulate the grid bias thereof inversely as the strength of the incoming carrier currents, the automatic volume control device 113 being of any suitable known type. A sensitive relay 114 having a movable armature 115 has its coil connected in series in the output circuit of the amplifier 108, as shown. The sensitive relay 114 may alternatively be connected to other circuits of the radio receiver instead of to the circuit shown.

In the operation of the device with the input circuit 110 untuned to the carrier frequency, a slight negative grid bias is supplied to the grid 116 of the amplifier 108 so that the current through the relay 114 is at a substantial maximum value, and its armature 115 is held in the position shown, out of contact with its cooperating contact 117. No signal currents appear in the output circuit of the detector 109, nor in the transformer winding 37, so that the recorder unit 18 is not energized. Also the relay 70 is not actuated so that there is no feed of the record 11 of the first machine. Upon tuning the input circuit 110 to the carrier frequency by the condenser 111, the bias voltage applied to the grid 116 by the automatic volume control device 113 is increased, thereby reducing the current through the winding of the relay 114. This causes its armature 115 to move to the left into engagement with the contact 117 and close the circuit through battery 118, lead 119, relay 70, lead 102, switch arm 73, lead 120 and contact 117. The actuation of the relay 70 immediately causes the rotation of the record 11 of machine 1 in the same manner as previously above described. The signal modulations now appearing in the output circuit of the detector 109 are amplified, in the amplifiers 26, 27 and 28, and impressed on the recorder 18 by means of the circuit shown, including the secondary winding 37, leads 59, 60 and switch arm 42. It is thus apparent that the feed of the record is automatically initiated by the impression of the carrier current on the radio receiver. Upon the disappearance of the carrier, the current through the winding of relay 114 will automatically increase, due to the decrease in the bias voltage applied to control grid 116, thus pulling the armature 115 to the right and breaking the energizing circuit of the relay 70 at contact 117. This action causes the circuit of relay 76 to be broken and its armature 77, after a short interval, to fall into its lower position, as shown. This causes the record 11 and the motor 14 to be automatically stopped in the manner above described in connection with Figs. 3 and 4.

Where the signal to be recorded requires more than one record, the rotation of the record 11' of the second machine will be automatically started when the relay 70' is operated in the manner before described in response to the engagement of the switch contact 24 with the contact 22 of machine 1. The recording of the broadcast signal will then proceed on the records of both machines 1 and 2 until the switch contact 24 comes into engagement with contact 23, and the record 11 of machine 1 is brought to a stop in the manner heretofore described. Also, in the manner heretofore described in connection with Figures 3 and 4, the recording of the broadcast signal will be continued on the record 11 of machine 1 after the record 11'' of machine 3 is filled. It is thus possible, according to the invention, by means of a bank of two or more machines to completely record a broadcast signal of any length without any interruption whatsoever in the recording, or loss of any portion of the signal.

The embodiment of the invention shown in Figures 6 and 5 is similar to that above described in connection with Figures 6 and 4, the three recording machines being operated by means of the single electric motor 14 as previously described in connection with Fig. 5. It will be understood, with the switch shaft 39 in the position shown, that upon tuning the input circuit 110 of the receiver to the carrier frequency, the plate current of amplifier tube 108 will decrease, due to the increase in negative grid bias on the control grid 116, causing the armature 115 to drop away from the relay 114, and engage the contact 117. In the manner above described in connection with Figures 6 and 4, this action causes the operation of the relays 70 and 76 and lowering of the feed roller 97 into engagement with the surface of record 11, thereby causing the record to immediately start. The amplified signal modulations appearing in the output circuit of amplifier 28 are impressed on the recorder 18, causing its stylus 19 to form a corresponding sound track in the record. The recording proceeds on the first machine until its switch contact 24 engages the contact 22, when feed roller 97 of the first machine will be again elevated into the position shown, causing the record 11 to immediately stop and the recording to proceed on the record 11' of the second machine, in the manner heretofore described in more detail in connection with Figures 3 and 5. The operation of the lamps 53, 53' and 53'' to indicate which of the machines is recording, and of the warning bell 51 to warn the operator if the next succeeding machine is not properly loaded, is the same as that above described in connection with Figures 3 and 5 so that further description thereof is believed to be unnecessary.

It will be understood that the embodiments of the invention shown in Figs. 6-4 and 6-5 may be utilized for recording broadcast signal modulations of any type as, for example, speech, music or other type of radio signals.

I have described what I believe to be the best embodiments of my invention. I do not wish, however, to be confined to the embodiments shown, but what I desire to cover by Letters Patent is set forth in the appended claims.

I claim:

1. A device for recording a signal on a plurality of thin disc records comprising, in combination, means for driving the records at variable angular velocities during the recording, means for recording a portion of the signal on one of the records, and means controlled automatically by the record driving means for recording a subsequent portion of the signal on another of the records.

2. A device for recording a signal on a plurality of thin disc records comprising, in combination, means for driving the records at variable angular velocities during the recording, means for recording a portion of the signal on only one of the records, means controlled automatically by the record driving means for recording a subsequent portion of the signal on said one record and also on another of the records and means controlled automatically by the record driving means for recording the remaining portion of the signal on said other record.

3. A device for recording signal modulations comprising, in combination, means for driving a first thin disc record continuously at a variable angular velocity, means for recording signal modulations on said first record, means for driving a second thin disc record continuously at a variable angular velocity, means for recording signal modulations on said second record and means automatically responsive to the driving means of the first record as the first record becomes exhausted to instantaneously render the means for recording the signal modulations on the second record effective.

4. The combination as set forth in claim 3 in which the means for driving the first and second records comprises a single electric motor.

5. A device for recording signal modulations comprising, in combination, means including a friction roller for engaging the surface of and driving a first thin disc record at a continually varying angular velocity, means for recording the signal modulations on said first record, means including a second friction roller for engaging the surface of and driving a second thin disc record at a continually varying angular velocity, means for recording the signal modulations on said second record and means automatically responsive to the driving means of the first record to initiate the rotation of the second friction roller for driving the second record.

6. The combination as set forth in claim 5 in which the automatically responsive means is arranged to initiate the rotation of the second friction roller an appreciable time before the first record is exhausted.

7. The combination as set forth in claim 5 in which the automatically responsive means is arranged to initiate the rotation of the second friction roller an appreciable time before the first record becomes exhausted and to also stop the first named friction roller as the first record becomes exhausted.

8. A device for recording a signal having tone modulations on a plurality of records comprising, in combination, recording means for recording the signal on the records, driving means adapted for driving the first record across the path of the recording means, means responsive to the tone modulations for automatically rendering said driving means effective to drive the first record, a second driving means adapted for driving the second record across the path of the recording means and means responsive to the tone modulations for automatically rendering said second driving means effective to drive the second record whereby a subsequent portion of the signal is recorded on the second record.

9. A signal recording device as set forth in claim 8 in which the first and second driving means are arranged to continue the driving of their respective records during the brief intervals between successive portions of the signal.

10. A signal recording device as set forth in claim 8 in which the second driving means is rendered effective to drive the second record an appreciable time before the first record is exhausted.

11. A signal recording device as set forth in claim 8 in which the first and second driving means comprises rotatable spindles and a single electric motor is provided for rotating the spindles.

12. A signal recording device as set forth in claim 8 in which the second driving means is automatically rendered effective to drive the second record in response to the exhaustion of the first record.

13. A device for recording signal modulations transmitted by radio frequency carrier currents on a plurality of records, the device comprising, in combination, recording means adapted to record the signal modulations on the records, means adapted to advance the records with reference to the recording means, control means responsive to the carrier currents for automatically rendering the record advancing means effective to advance a first record, means for energizing the signal recording means by the signal modulations and means whereby said control means renders the record advancing means effective to advance a second record.

14. A signal recording device as set forth in claim 13 in which the control means includes means for automatically rendering the record advancing means ineffective to advance either of the records upon the disappearance of the carrier waves.

15. A device for recording signal modulations transmitted by radio frequency carrier currents on a plurality of records, the device comprising, in combination, recording means adapted to record the signal modulations on the records, means adapted to advance a first record along the path of the recording means, means adapted to advance a second record along the path of the recording means, a radio receiver having input and output circuits, means connecting said recording means to the receiver output circuit, control means whereby the tuning of the receiver input circuit to the carrier frequency automatically renders the record advancing means effective to advance the first record and means responsive to the advancement of the first record for automatically rendering the means for advancing the second record effective to advance it along the path of the recording means.

16. A device for recording a signal on a plurality of records comprising, in combination, means including a first carriage movable between initial and final positions arranged to translate a first record, means including a second carriage movable between initial and final positions arranged to translate a second record, means for recording a portion of the signal on the first record, an indicating device, means including a switch operated by the second carriage for energizing said indicating device during the recording on the first record in response to the positioning of the second carriage in its final position and means for recording a subsequent portion of the signal on the second record.

17. A recording device as set forth in claim 16 in which the indicating device is constructed to sound an alarm.

18. A device for recording a signal on a plurality of thin disc records comprising, in combination, means for rotating the records, means for recording a portion of the signal on one of the records, a visual indicating device arranged to indicate during the recording on said one record, means controlled automatically by the record rotating means for recording a subsequent portion of the signal on another of the records and a second visual indicating device separate from said first named indicating device and arranged to indicate during the recording on said other record.

19. A signal recording device as set forth in claim 18 in which means is provided to cause both the indicating devices to indicate during the recording of an intermediate portion of the signal on both of the records.

20. A device for recording signal modulations on at least two thin flexible disc records comprising, in combination, a vertical record carriage spindle mounted for rotation and translation and adapted to engage the first record, rotatable means including a friction roller arranged to engage the surface of the first record to rotate the same at a continually varying angular velocity, means for recording a portion of the signal modulations on the first record, a second vertical record spindle mounted for rotation and translation and adapted to engage the second record, rotatable means including a second friction roller adapted to engage the surface of the second record, means arranged to record a subsequent portion of the signal modulations on the second record and means automatically responsive to the translation of the first record spindle to a predetermined position for causing the second friction roller to engage the surface of and rotate the second record at a continually varying angular velocity.

21. A device for recording a signal on at least two disc records comprising, in combination, rotatable means adapted to engage the surface of and rotate the first record at a continually varying angular velocity, a first record carriage arranged to be translated in response to the rotation of the first record and to bodily translate said first record, means for recording a portion of the signal on the first record, rotatable means adapted to engage the surface of and rotate the second record at a continually varying angular velocity, a second record carriage arranged to be translated in response to the rotation of the second record and to bodily translate the second record, and means including a switch operated by the first record carriage for causing a subsequent portion of the signal to be recorded on the second record.

22. A device for recording a signal on at least two records comprising, in combination, a first record carriage arranged to translate the first record bodily, means for rotating the first record at a continually varying angular velocity, means for recording a portion of the signal on the first record, a second record carriage arranged to translate the second record bodily, driving means adapted to rotate the second record at a continually varying angular velocity and means including a switch operated by the first record carriage for initiating the rotation of the second record by said driving means and for recording a subsequent portion of the signal on the second record.

23. A device for recording signal modulations comprising, in combination, an amplifier having input and output circuits, means for applying the signal modulations to the amplifier input circuit, means for driving a first thin flexible disc record, a first recorder having a stylus in engagement with the first disc record, means for driving a second thin flexible disc record, a second recorder having a stylus in engagement with the second record, a switching device arranged to render the driving means effective to rotate the first disc record and to simultaneously connect the first recorder to the amplifier output circuit, and means comprising a step-by-step relay and a switch shaft arranged to be intermittently rotated by said relay, said means being automatically responsive to the means for driving the first disc record to adjust the switching device for rendering the driving means effective to rotate the second disc record and also to simultaneously connect the second recorder to the output of the amplifier output circuit.

24. The recording device as claimed in claim 23 in which said switch shaft is provided with a plurality of spaced apart switch blades, said switch blades being advanced in short steps by said step-by-step relay.

FERDINAND C. W. THIEDE.